United States Patent [19]
White

[11] 3,873,289
[45] Mar. 25, 1975

[54] AIR CONDITIONER SERVICING UNIT

[76] Inventor: Kenneth R. White, c/o K-Whit Tools, Inc., 5144 E. 65th St., Indianapolis, Ind. 46220

[22] Filed: Jan. 2, 1974

[21] Appl. No.: 429,768

[52] U.S. Cl. ............... 62/149, 62/157, 62/292, 62/468
[51] Int. Cl. ............................. F25b 45/00
[58] Field of Search ....... 62/77, 149, 157, 292, 468, 62/475

[56] References Cited
UNITED STATES PATENTS

| | | | |
|---|---|---|---|
| 2,499,170 | 2/1950 | Shoemaker | 62/149 |
| 3,076,319 | 2/1963 | White | 62/292 |
| 3,093,979 | 6/1963 | Ehrens | 62/292 |
| 3,208,232 | 9/1965 | Madison | 62/292 |
| 3,225,554 | 12/1965 | Alexander | 62/292 |
| 3,289,426 | 12/1966 | Music | 62/292 |
| 3,302,421 | 2/1967 | Karnes | 62/292 |
| 3,695,055 | 10/1972 | Bruce | 62/157 |
| 3,785,163 | 1/1974 | Wagner | 62/292 |
| 3,813,893 | 6/1974 | Gemender | 62/292 |

Primary Examiner—Meyer Perlin
Attorney, Agent, or Firm—Trask, Jenkins & Hanley

[57] ABSTRACT

Apparatus for servicing automobile air conditioning systems, as for charging them with refrigerant and compressor lubricant. Hoses connect to the high and low pressure charging fittings on the system and lead to pressure gauges for checking the system. The high pressure hose also leads to a dumping valve for emptying the system. The low pressure hose is connected through control valves (a) to a vacuum pump for purging the system, and also through a constant flow valve both (b) to a pressurized source of refrigerant liquid and (c) to a pressurized source of oil. Charging is done to the suction side of the compressor while it is operating. The flow valve passes liquid through a small orifice at a controlled pressure drop. This limits oil flow to a rate, such as one ounce in 45 seconds, slow enough to avoid damaging the compressor, and meters refrigerant in liquid state at a constant rate, e.g. one pound per 90 seconds. As refrigerant leaves the metering valve it is atomized and vaporized before entering the system. Preset timers control the periods of constant flow of oil and refrigerant and thereby meter the quantities charged to the system. A third hose and pressure gauge are provided for servicing those systems having a pressure ratio valve between the evaporator and the compressor.

11 Claims, 4 Drawing Figures 3,873,289

AIR CONDITIONER SERVICING UNIT

BACKGROUND OF THE INVENTION

This invention relates generally to an apparatus for servicing an air conditioning system. More specifically, this invention relates to an apparatus for charging an automobile air conditioner with metered quantities of refrigerant and lubricant and for performing other servicing tests and operations.

Automotive air conditioning systems periodically require servicing to insure that the system is maintained at proper operating conditions and especially that refrigerant and lubricating oil are at proper levels. Connections are provided near both the low pressure suction port and the high pressure discharge port of the compressor which may be used to add refrigerant and lubricant to the system.

One common way to add refrigerant to a system is to inject a pre-measured amount of liquid refrigerant under high pressure into the high pressure discharge port while the compressor is at rest. While this method permits an accurate determination of the quantity of refrigerant actually added to the system, it has several disadvantages. Injecting liquid refrigerant into the system requires complicated and expensive equipment to highly pressurize the refrigerant to maintain it in liquid state and to inject it against the high pressure in the system. Moreover, injecting refrigerant to the high side when the compressor is running is impractical because the compressor develops such high pressures on that side while running. Charging of the system on the high pressure discharge side of the compressor can only be done practically when the compressor is turned off. This is undesirable since most systems utilize a conventional sight glass to indicate the level of refrigerant in the system, and such sight glass does not give a reading of the refrigerant level when the system is turned off. Therefore, a mechanic adding refrigerant to the high side of the system must alternately add refrigerant while the system is off and then start the system to check the true refrigerant level. This procedure requires guesswork as well as constant attention, and is excessively time consuming.

Another common way to add refrigerant to an automobile refrigeration system is to pressure inject known quantities of refrigerant into the low pressure suction port of the compressor. This can be done while the compressor is running since pressures developed at the suction port of the compressor are much lower than those developed at the discharge port, i.e., about 30 psi at the suction port as opposed to between about 110 to 350 psi at the discharge port. This procedure permits a mechanic to observe the sight glass while at the same time adding refrigerant to the system so that he can readily determine how much additional refrigerant is required. However, refrigerant in vapor form should be introduced into the suction side of the compressor, because of the danger of damage to the valves or other parts of the compressor if the compressor takes in through its suction port significant amounts of liquid. The refrigerant must therefore be converted from liquid form to vapor form before it can be added to the system through the suction port.

Refrigerant in vapor form is normally added to the system by connecting a pressurized source of refrigerant to the suction port of the compressor and allowing the liquid refrigerant to boil off into the system in vapor form. This is a slow procedure, however, and takes about 20 minutes for 1 pound of refrigerant to vaporize and enter the system. To save time, many mechanics do not let the refrigerant vaporize, but instead feed the refrigerant in liquid form directly into the system, which risks damage to the compressor valves.

Lubricant is conventionally added to the system through the suction port of the compressor, and this is normally done while the compressor is running and is done at a very slow rate to guard against compressor valve damage. The most common way of adding lubricant to the system is to pressurize the lubricating oil with refrigerant gas, and to then pressure-inject the oil into the suction side of the compressor. The pressurizing refrigerant gas, however, is readily absorbed by the oil, and the amount of refrigerant that the oil absorbs varies greatly with ambient temperature. Whenever oil is added by this procedure, some refrigerant in vapor form is also added, and because of variations in ambient temperature, it is extremely difficult to accurately determine how much refrigerant has been added along with the oil. This creates added uncertainty and requires guesswork, and makes this conventional oil charging procedure undesirable.

The present invention overcomes the disadvantages of the prior art by providing an efficient unit for quickly and easily charging an automobile air conditioning system with accurately metered quantities of both refrigerant and lubricant. Moreover, the present invention enables the refrigerant and the lubricant to be added to the system through the suction port of the compressor while the compressor is running without any danger to the system.

SUMMARY OF THE INVENTION

A service unit embodying the present invention has high and low pressure hoses for connection to the service fittings at the pressure side and suction side of the compressor of the refrigeration system being serviced. A third hose may be provided for connection to a pressure ratio valve when such a valve is present in the system. The three hoses are connected to pressure gauge on the service unit for checking the system against known standards such as provided by the maker of the system being serviced. The high pressure hose is also connected to a dumping valve leading to a discharge container, for emptying the system when service conditions require.

In accordance with the present invention, the low pressure hose is connected to three lines containing control valves, including (a) a vacuum line from a vacuum pump in the service unt, (b) a refrigerant charging line containing a shut-off valve and leading from a pressurized source of refrigerant through a constant flow valve, and (c) an oil charging line containing a shut-off valve and leading from a source of oil under pressure through a constant flow valve. Desirably the same constant flow valve serves both the oil charging line and the refrigerant charging line. The vacuum pump and the refrigerant and oil shut-off valves are controlled by separate timers. In the charging lines, the timers control the time of constant flow of refrigerant and oil and hence meter the quantities of refrigerant and oil charged to the system. The constant flow valve and refrigerant line are desirably arranged to meter refrigerant in liquid state through a small orifice in the flow valve and thereafter to cause the liquid to be atomized before the refrigerant enters the compressor of the system, to avoid danger of damage to the compressor valves. Oil is metered at a slow rate, e.g. 1 ounce in 45 seconds, low enough to avoid damage to the compressor valves.

BRIEF DESCRIPTION OF THE DRAWINGS

The accompanying drawings illustrate the invention. In such drawings.

DETAILED DESCRIPTION OF THE PREFERRED EMBODIMENT

Figure 1:
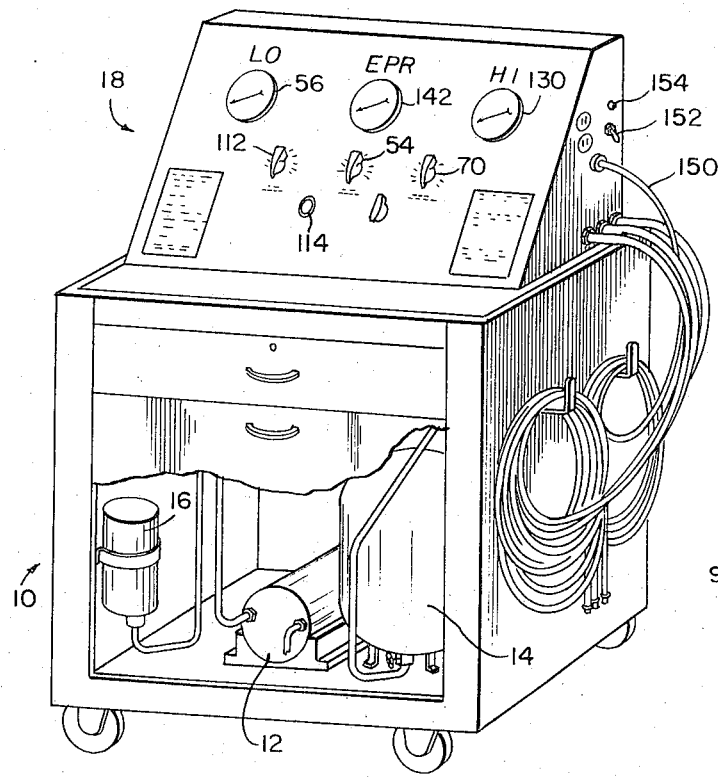
FIG. 1 is a perspective view of an air conditioning servicing unit embodying the invention.

The air conditioner servicing unit shown in FIG. 1 generally comprises a lower cabinet 10 containing a vacuum pump 12, a pressurized refrigerant supply tank 14, and a pressurized oil supply tank 16. Gauges, valves and controls for checking the air conditioning system and monitoring and selectively controlling its servicing are disposed in an instrument panel 18 mounted on top of the lower cabinet 10.

The servicing apparatus includes three interrelated sections, namely a high-pressure section, a low-pressure section, and an evaporator pressure ratio (EPR) section. Each of these includes a hose provided with a coupling for connection to an appropriate fitting on the air conditioner system, a pressure gauge for reading the pressure at such fitting, and valves and controls for servicing as described below.

Figure 2:
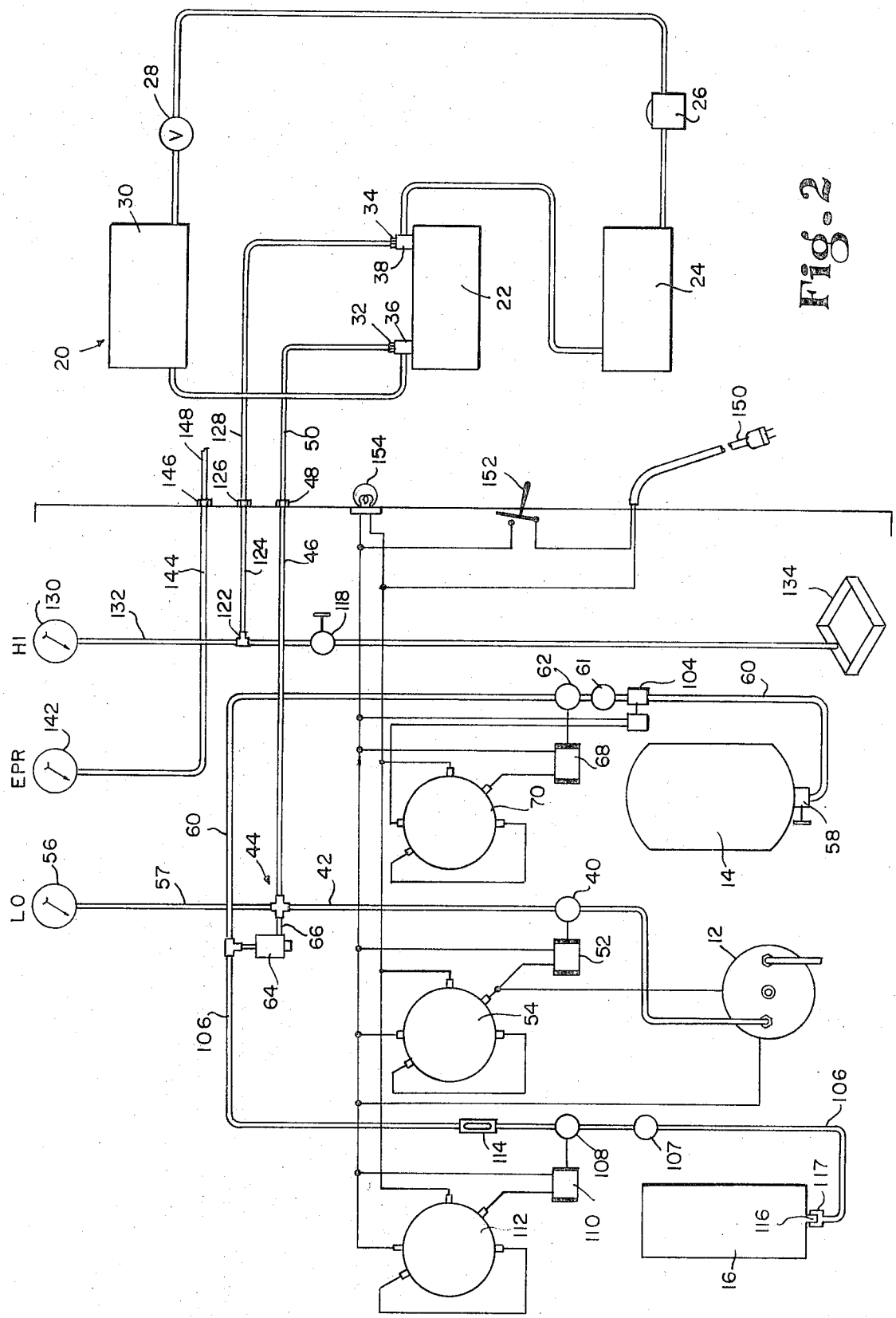
FIG. 2 is a diagrammatic view of the unit of FIG. 1 shown coupled to the usual charging connections of an automobile air conditioning system.

All electrical components of the servicing unit are desirably operable on standard household current. As shown in FIGS. 1 and 2, a power cord 150 provides power to the unit through a master on-off switch 152 mounted on the instrument panel 18. Preferably, a warning light 154 is coupled to the master switch 152 so that the light 154 will burn whenever the unit is turned on.

A typical automotive air conditioner is shown in FIG. 2. This comprises a closed and pressurized system 20 containing a refrigerant such as that known as R-12, which is sold by the DuPont Corporation under the trademark FREON 12. The system includes a compressor 22 which compresses refrigerant gas and delivers it to a condenser 24 where the gas is converted to liquid. The condenser discharges through a sight glass 26 which provides visual observation of the fill level of refrigerant in the system during operation. The sight glass 26 unit normally also includes a reservoir for storing liquid refrigerant under conditions of large load fluctuations on the system, and includes a high-pressure filter and desiccant to trap and hold any moisture or solid particles which may be present in the system. From the sight glass 26, the refrigerant is delivered through an expansion valve 28 to an evaporator 30 where the refrigerant is evaporated to gaseous form as the system provides cooling, all in a well-known manner. From the evaporator 30, the refrigerant gas returns to the compressor 22.

For purposes of initially charging the system and for periodically servicing the system with refrigerant and lubricating oil, the compressor 22 has a pair of valve nipples 32 and 34 respectively located at or near its low pressure suction port 36 and its high pressure discharge port 38. These nipples 32 and 34 provide connections for pressure gauge readings and for the additions of refrigerant and lubricating oil at either the discharge port 38 or the suction port 36 of the compressor.

In accordance with the present invention, the low pressure section of the servicing unit is the primary section used for charging the air conditioner system, and for introducing additional refrigerant or lubricant as needed. The low pressure section of the servicing unit comprises a hose 50 having a coupling at its end adapted to be connected to the valved nipple 32 at the low pressure port 36 of the compressor. Such hose is connected through a nipple 48 at the side of the instrument panel 18 to a line 46 leading to a four-way connector 44. The nipple contains a check valve closing forward the hose, which is opened by the hose coupling when it is connected. One branch of the connector 44 is connected to a line 57 leading to a low pressure gauge 56, which will continuously register the pressure at the low pressure port 36 when the hose 50 is connected to the valved nipple 32. A second branch of the connector 44 is connected to a vacuum line 42 leading to the vacuum pump 12 but containing a normally-closed shut off valve 40 arranged to close as a check valve in the direction of flow from the connector 44 to the vacuum pump 12 but connected to be opened by a solenoid 52. The solenoid 52 is connected in parallel with the motor of the vacuum pump 12 in a circuit controlled by a timer 54. The timer 54 is of a type which can be pre-set to actuate the pump and solenoid circuits for selected predetermined time periods.

The third branch of the connector 44 of the low pressure section is connected by a tubing 66 to a constant flow valve 64 which in turn is connected both to a refrigerant supply line 60 and an oil supply line 106. The refrigerant supply line 60 leads to the pressurized refrigerant supply tank 14 and contains a number of controls. The tank 14 itself has a manual shut off valve 58 for closing the tank when it is disconnected from the line 60 as for replacement. The line 60 contains a check valve 61 which closes in the direction of flow toward the supply tank 14 to prevent any possibility of back flow from the compressor or the oil supply line to the refrigerant supply tank. The line also contains a normally closed shut off valve 62 which desirably closes as a check valve in the direction of flow from the refrigerant tank to the constant flow valve 64 and which is arranged to be opened by a solenoid 68 controlled by a timer 70. The refrigerant supply line 60 is connected below the check valve 61 to a pressure-responsive switch 104 connected in a series in the power supply line to the timer 70, and arranged to open that power supply line when the pressurized refrigerant supply is exhausted and the pressure falls below a predetermined pressure necessary to charge the air conditioning system.

The refrigerant tank contains refrigerant which vaporizes below atmospheric temperature, but which is stored under sufficient pressure to liquefy it. The refrigerant vapor pressure maintains pressure in the tank.

The tank is mounted in inverted position with its delivery outlet at the bottom, so that such outlet will be at the bottom of the pool of liquid in the tank and the pressurizing gas at the top. Refrigerant delivered to the line 60 will then be in liquid state.

The oil supply line 106 leads from the constant flow valve 64 to the pressurized oil supply tank 16 and contains a number of controls. The tank itself has a normally-closed valve in its connector 116, which closes as a check valve in the direction of flow out of the tank and which is mechanically opened by the connector 117 on the end of the line 106. The line 106 includes a check valve 107 which closes in the direction of flow toward the oil supply tank 16 so as to prevent back flow from the air conditioning system or the refrigerant supply system to the oil tank. The oil line 106 also contains a shut off valve 108 which normally closes in the direction of flow away from the pressurized oil tank and which is arranged to be opened by a solenoid 110 controlled by a timer 112. The line also includes a sight glass 114 mounted on the face of the instrument panel 18.

The oil tank is mounted in inverted position so that its oil delivery outlet is at the bottom of the pool of oil in the tank and the pressurizing gas is at the top of the tank. The gas used is desirably nitrogen, which does not dissolve in the oil. The pressure used must be sufficient to overcome the pressure at the suction port 36 of the compressor when the air conditioning system is operating, so as to propel oil through the constant flow valve and into the system when the shut off valve 108 is held open by the solenoid under control of the timer 112. The pressure used is desirably such that substantially all of the oil will be delivered before the pressure drops below the normal operating pressure at the suction side of the compressor and hence loses its propelling force. Desirably, however, excess pressure is avoided, so as to avoid flow of nitrogen to the air conditioning system. The sight glass should be observed while charging oil, and if bubbles appear, the charging should be stopped and the oil tank replaced or refilled.

The three timers 54, 70, and 112 are mounted on the instrument panel 18 and have control handles accessible to the operator for presetting the timers for selected times of operation.

The high pressure section of the servicing unit comprises a high pressure hose 128 connected through a nipple 126 at the side of the instrument panel 18 to a line 124 leading to a tee 122. One branch of the tee 122 is openly connected through a line 132 to a high pressure gauge 130 so that such gauge registers the pressure at the high pressure port 38 at all times while the high pressure hose is connected to the nipple 34 at that port. The other branch of the tee 122 is connected through a manual dump valve 118 to a collection tray 134. When it is desired to empty the air conditioner system, the dump valve is opened to discharge to the tray 134, which collects the liquid and allows the refrigerant to evaporate.

Figure 4:
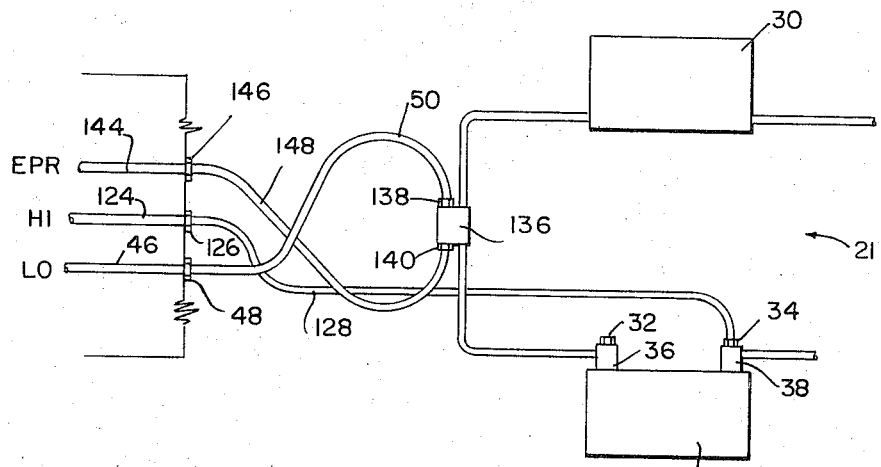
FIG. 4 is a partial diagrammatic view of the servicing unit coupled to an automobile air conditioning system having an evaporator pressure ratio (EPR) valve.

The evaporator pressure ratio (EPR) section comprises a hose 148 adapted to be connected to an evaporator pressure ratio valve 136, FIG. 4, when the air conditioning system being tested has such a valve. The hose 148 is connected through a nipple 146 on the side of the instrument panel 18 to a line 144 leading to an EPR pressure gauge 142. This EPR system is used when testing an air conditioning system having an EPR valve 136 between the evaporator 30 and the pressure suction port 36, as shown in FIG. 4. The valve 136 has a nipple 138 on the compressor side to which the low pressure hose 50 is connected and has a nipple 140 to which the EPR hose 148 is connected.

Figure 3:
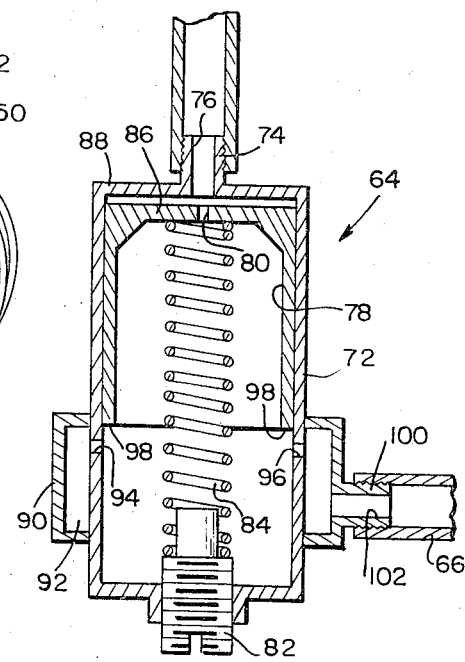
FIG. 3 is an enlarged sectional view of a constant flow valve used in the charging unit of FIGS. 1 and 2.

An enlarged sectional view of a pressure-regulated, constant flow valve 64 as used in this invention is shown in FIG. 3. Such a valve 64 comprises a hollow cylindrical housing 72 having an inlet connector nipple 74 in its end wall 88, defining an opening 76 extending into the hollow interior of the housing 72. A piston 78 is slidably received within the housing 72, and comprises a cylindrical side wall and an end wall 86 having a small orifice 80 adjacent the connector nipple 74. In a specific embodiment designed for use with R-12 refrigerant, the orifice 80 had a diameter of 0.040 inch. The piston is open at its bottom end. A solid core 82 is threaded into the lower end of the housing 72 as viewed in FIG. 3, and a spring 84 is mounted about the core 82. The spring 84 bears against the upper end wall 86 of the piston 78 so as to urge the piston toward the end wall 88 of the housing 72.

A cylindrical collar 90 is mounted about the lower end of the housing 72 and defines an open chamber 92 which extends circumferentially about the housing 72. The chamber 92 communicates with the hollow interior of the housing 72 through a pair of diametrically opposed restricted orifices 94 and 96 which are drilled in said housing just below the bottom edge 98 of the piston 78. In a specific embodiment using an 0.040-inch orifice 80, the orifices 94 and 96 had a diameter of 0.050 inch. An outlet connector nipple 100 is mounted on the cylindrical collar 90 and defines an outlet opening 102 from the interior of the collar 90. The nipple 100 is connected to the short tube 66 leading to the four-way fitting 44.

In operation of the constant flow valve 64, liquid refrigerant flows under pressure from the supply line 60 to the inlet nipple 74. In the constant flow valve 64, such liquid refrigerant passes through the small orifice 80 in the end wall of the piston 78 and into the hollow interior of the piston. It then passes through the opposed orifices 94 and 96 and into the circumferential chamber 92. From there, the refrigerant passes out of the valve 64 through the outlet nipple 100 to the four-way fitting 44 and thence to the low pressure line 46.

The flow of refrigerant through the small orifice 80 creates a pressure drop across the piston which urges the piston downward as viewed in FIG. 3 and against the spring 84. As the piston 78 moves downward, the bottom edge 98 of its side wall partially closes the diametrically opposed orifices 94 and 96 and reduces the flow rate through those orifices. Such closing creates back-pressure to reduce the pressure drop across the orifice 80. Downward movement of the piston 78 due to the refrigerant flow is opposed by the spring 84 which urges the piston upward, in a direction to open the orifices 96 and 94. The action of the piston 78 maintains a substantially constant flow rate through the valve 64 regardless of pressure variations across the valve as a whole. The quantity of refrigerant that is delivered through the valve 64 and into the air conditioner system 20 is therefore a direct function of time and can be accurately controlled by the electrical timer 70.

The actual flow rate of refrigerant through the valve 64 is dependent upon the pressure exerted by the spring 84, and this is adjustable to calibrate the valve to give a desired flow rate. It has been found that a refrigerant flow rate of about 1 pound per 90 seconds is desirable to rapidly deliver refrigerant to the air conditioning system.

In this invention, the constant flow valve 64 serves the added and important function of atomizing and vaporizing the liquid refrigerant as the refrigerant passes through the valve 64. There is a substantial pressure drop as the refrigerant passes through the orifices 94 and 96, which are partially closed by the piston, and it is believed the refrigerant is sprayed through such orifices and is thereby atomized and at least partially vaporized as it leaves such orifices. Further vaporization is believed to occur in the line 46 and hose 50, so that the refrigerant is in atomized and vapor form as it enters the compressor. The refrigerant in this form can be delivered directly into the suction side 36 of the compressor 22 while the system is running without danger of harming the compressor valves or damaging the system in any way.

Operation of the servicing unit in servicing a conventional air conditioning system as shown in FIG. 2 will vary depending on the service problem which exists. In general, use of the unit is as follows: The low pressure hose 50 is connected to the valved nipple 32 at the suction side of the compressor, and the high pressure hose 128 is connected to the nipple 34 at the high pressure side of the compressor. This connects the low and high pressure sides of the compressor to the low and high pressure gauges 56 and 130. The readings on those gauges are then read under approporiate operating conditions and are compared with known standards for the air conditioning system being tested, for example, the standards furnished by the system manufacturer. Observation is made of the sight glass 26 to determine whether or not a proper fill level of refrigerant is present.

Under some circumstances, as when the system requires replacement of one of its elements, the system must first be emptied of pressurized refrigerant. For this purpose, the dump valve 118 is opened, which allows the pressurized contents of the system to escape through the high pressure hose 128 and the dump valve 118 to the collection tray 134. Oil is collected in the tray, and refrigerant evaporates.

After replacement of a component of the air conditioner system, and in certain other cases, the system should first be evacuated before being recharged. For this purpose, the control timer 54 for the vacuum pump 12 is set to a predetermined operating time, and this energizes the vacuum pump 12 and opens the shutoff valve 40 so that the vacuum pump 12 evacuates the system through the low pressure hose 50, the low pressure line 46, and the vacuum line 42. At the end of the set time, the timer de-energizes both the pump 12 and the valve solenoid 52, and the shutoff valve 40 closes.

When the air conditioner system has been sufficiently evacuated, it is then charged with oil and refrigerant. Such charging is done to the suction side of the system while the coompressor is operating. To charge the system with oil, the oil control timer 112 is set to energize the solenoid 110 and open the shutoff valve 108 in the oil line 106 for a predetermined time corresonding to the amount of oil desired to charge to the system. Under normal operating conditions, oil will flow through the constant flow valve 64 at a slow rate, for example, to deliver 1 ounce in 45 seconds. Hence, if a normal charge of 2 ounces of oil is desired, the timer 112 is set for 90 seconds. When the solenoid 110 opens the shutoff valve 108, oil flows from the pressurized tank 16 through the line 106 to the constant flow valve 64, through that valve at a regulated rate, and thence to the low pressure line 46 and hose 50. Because of the volume within the constant flow valve and the line 46 and the hose 50, the total charge of oil which passes the regulating orifice 80 in the constant flow valve 64 may not enter the compressor during the oil charging cycle. Oil remaining in the valve and lines will be propelled to the compressor by refrigerant flow during the subsequent refrigerant charging step.

To charge refrigerant, the refrigerant charging timer 70 is preset to a selected time. Under proper operating conditions, pressurized refrigerant flows in liquid state through the constant flow valve 64 at a constant rate, such as 1 pound in each 90 seconds, and the timer 70 is set to hold the shutoff valve 62 open for a predetermined time sufficient to allow the desired charge of refrigerant to pass the constant flow valve 64 at that rate. Thus, if 2 pounds of refrigerant is desired, the timer 70 is set for 3 minutes or 180 seconds. In the constant flow valve 64, the refrigerant stays in liquid state as it passes through the metering orifice 80 and as it passes through the internal chamber of the flow valve 64 and through the outlet orifices 94 and 96. As it passes through those orifices to the chamber 92 and thence to the low pressure line 46 and low pressure hose 50, the refrigerant undergoes a substantial pressure drop and is changed from liquid to atomized or vapor state, so that by the time it enters the operating compressor 22, it will be in atomized or vapor state to avoid damage to the compressor valves.

The oil charging system and the refrigerant charging system may also be used to add oil or refrigerant to an air conditioning system in servicing operations, without first evacuating the entire system.

In the event the oil supply is depleted during the charging operation, the pressurizing nitrogen gas will begin to appear as bubbles in the sight glass 114 in the oil charging line 106 and exposed on the instrument panel 18. The operator should then immediately stop the operation, as by throwing the master switch 152, and replace the depleted oil supply tank 16 with a full tank.

If the refrigerant in the pressurized refrigerant tank 14 becomes depleted during a refrigerant charging cycle, the pressure generated by vapor pressure of the refrigerant in the tank, normally 60 psi or more, will drop to a point below that required to hold the pressure responsive switch 104 in closed position, for example, below 40 psi, and such switch will open. This will interrupt power to the timer 70 and to the solenoid 68 of the shutoff valve 62, and the timer will stop and such valve will close. When this occurs, the operator should replace the refrigerant tank 14 with a filled tank. The pressure from the fresh tank will reactivate the pressure-sensitive switch 104, to close the switch and re-energize the timer 70 and the solenoid 68. Before allowing the charging to continue, the refrigerant charging line 60 and the low pressure line 46 and the hose 50 should be purged of any air which might have entered during the tank-replacement operation. For this purpose, the fitting on the hose 50 at the low pressure nipple 32 of the compressor should be loosened sufficiently to allow the nipple valve to close and to permit the hose to bleed to atmosphere long enough to purge the lines. In practice, such bleeding is accomplished in about 30 seconds. The timer 70 is reset to compensate for the time during which bleeding occurs.

The servicing unit in accordance with the present invention is especially advantageous over previously available equipment in that refrigerant and oil are each delivered to the automobile air conditioning system through a constant flow valve under control of a presettable timer. This permits the air conditioning system to be accurately charged with a desired amount of either refrigerant or oil, quickly and easily. Moreover, with the use of a small-orifice, pressure-regulated, constant flow valve, the refrigerant flashes off to vapor form as it leaves the valve and before it is delivered to the air conditioning system, so that the refrigerant is introduced into the suction side of the operating compressor in vapor state which presents no danger of damage to the compressor valves. Also, since the refrigerant is charged to the suction side of the compressor while the system is running, an accurate observation of the refrigerant level within the system can be obtained by observing the flow of refrigerant through the sight glass 26.

While the servicing unit shown uses a single constant flow valve for charging both refrigerant and oil, it will be understood that separate and independent flow valves could be used respectively in the refrigerant and oil charging lines. It is an advantage of the present invention that a single valve may be used for both. Because of the small orifices in the valve, oil is metered at a suitable slow rate, and refrigerant is not only metered at a constant flow rate, but is atomized and vaporized as it leaves the valve so that the refrigerant is introduced into the air conditioning system in a compressible-fluid state which will not damage the compressor.

Certain automobile air conditioning systems are provided with an evaporator pressure ratio valve between the evaporator and the compressor. This is operative to maintain the pressure across the evaporator 30 at a specified level irrespective of the compressor speed. When such a pressure regulator valve is present in the system, the refrigerant and oil charging connections are somewhat modified, as shown in FIG. 4. In using the present servicing unit with a system as shown in FIG. 4, the high pressure hose 128 is connected to the valve nipple 34 at the high pressure port 38 of the compressor 22, as before. No connection is made to the valve nipple 32 at the low pressure port 36. Instead, the low pressure hose 50 is connected to the nipple 138 of the EPR unit 136 contained in the line from the evaporator 30 to the compressor 22. The EPR hose 148 is connected to the nipple 140 of that EPR unit 136. With these different connections, the servicing operations of the system are the same as described above. That is, the system can be drained by opening the dump valve 118, which allows the system to empty itself through the high pressure line 128. Similarly, the system can be evacuated through the low pressure hose 50, as before, and oil and refrigerant can be charged to the system through that hose. The EPR hose connection serves the primary purpoe of providing the operator with a pressure reading on the pressure gauge 142 which he can compare with known criteria to determine the condition of the system.

I claim:

1. A servicing unit for air conditioning systems comprising a charging line containing a constant flow metering device adapted to pass charging fluid at a regulated rate, said line extending from said source and leading to a connector for connection to a charging fitting of the air conditioning system, a source of liquid refrigerant under pressure, and a line containing a control valve connecting said source to the constant flow metering device, a source of oil under pressure and a line containing a control valve connecting said oil source to said same constant flow metering device, and timing means connected to said control valves and operative to control the time during which flow occurs through said lines to the system, and thereby to meter to the system a quantity of fluid determined by said rate and the time.

2. A servicing unit for air conditioning systems, comprising a constant flow valve operative to pass a liquid at a constant flow rate and a line leading therefrom and adapted for connection to an air conditioning system to charge the same, a source of liquid refrigerant under pressure, and a line containing a control valve connecting the same to the constant flow valve, a source of lubricating oil under pressure and a line containing a control valve connecting the same to the constant flow valve in parallel with the refrigerant line, said valves being operative to selectively deliver either oil or refrigerant to the constant flow valve for delivery to the air conditioning system.

3. A servicing unit as in claim 2 with the addition of control means for selectively predetermining the time period during which one of said sources is connected to deliver its fluid to the constant valve and system.

4. A servicing unit as in claim 2, for servicing an air conditioning system comprising a compressor having suction and discharge ports, in which said line from the constant flow valve is adapted to be connected to the suction side of the system, said constant flow valve having a restricted orifice means of a size to pass oil at a slow rate insufficient to damage the operating compressor and of such size that under normal operating conditions refrigerant will remain substantially in liquid state thereto, the line leading from the constant flow valve being such that there will be a pressure drop beyond such orifice means so as to cause at least substantial atomization or vaporization of the refrigerant before it enters the compressor being charged.

5. A servicing unit as in claim 2 with the addition of a vacuum pump connected through a control valve to the line leading from the constant flow valve to the air conditioning system.

6. A servicing unit for servicing an air conditioning system, which includes a compressor having suction and discharge ports, comprising a constant flow valve and a line leading therefrom and adapted for connection to the suction side of an air conditioning system to charge the same, a source of liquid refrigerant under pressure, and a line containing a control valve connecting the same to the constant flow valve, a source of lubricating oil under pressure and a line containing a control valve connecting the same to the constant flow valve, said valves being operative to selectively deliver either oil or refrigerant to the constant flow valve for delivery to the air conditioning system, and a high-pressure line adapted to be connected to the high pressure side of the system, said high-pressure line containing a discharge valve for discharging the contents of the system.

7. A servicing unit for an air conditioning system to which refrigerant should be delivered in substantially vaporized or atomized state, comprising a source of refrigerant in liquid state under pressure which may vary under different conditions, a charging line extending from said source and leading to a connector for connection to a charging fitting of the air conditioning system, said line containing a constant flow metering device which includes two orifice means in series relation, and means responsive to the pressure drop across one of said orifice means to vary the pressure drop across the other orifice means in a direction to compensate for variations in the pressure drop across the first and thereby to provide a substantially constant flow rate for liquid through the metering device, the said orifice means being of such size as to cause the refrigerant to remain substantially in liquid state to the second orifice and thereby to be metered as liquid at such constant flow rate, and of such size that under normal operating conditions there will be a pressure drop at and beyond such second orifice means sufficient to cause at least substantial atomization and vaporization of the refrigerant before it enters the system being charged, a shut-off valve in said line, and a timer connected to control said shut-off valve and operative to open said valve for a predetermined time and thereby produce refrigerant flow at such constant flow rate for such predetermined time so as to deliver a measured quantity of refrigerant to the system being charged.

8. A servicing unit as in claim 7 in which said source of refrigerant is a closed container containing refrigerant in liquid state, pressurized by the vapor pressure of the refrigerant, so that the pressure varies with the temperature at which the container is maintained.

9. A servicing unit as in claim 7 in which the constant flow metering device comprises a cylinder having an inlet port at one end, a piston in the cylinder having a transverse wall and a cylindrical side wall, said piston and cylinder defining an inlet chamber communicating with the inlet port and a pressure chamber on the opposite side of the piston therefrom, a first orifice through the piston, leading from the inlet port to the pressure chamber, a second orifice through the wall of the cylinder, and an outlet to which said second orifice leads, the skirt of the piston being movable to partially close the second orifice as the piston moves in a direction away from the inlet port, and means for exerting a calibrated thrust on the piston to bias the same toward the inlet end of the cylinder, said first orifice being operable under flow conditions to cause a pressure drop across the piston and thereby urge the same against the said bias in a direction to close the second orifice and cause back-pressure in said pressure chamber, whereby to regulate the pressure drop across the first orifice.

10. A servicing unit as in claim 7 with the addition of a source of oil under pressure and a line containing a shut-off valve connecting said oil source to said constant flow metering device for delivery of oil therethrough to the system being charged, and an oil timer operable to open said shut-off valve for a predetermined time to allow oil to flow for such time at a constant rate through said metering device.

11. A servicing unit for air conditioning systems comprising a pressurized container of lubricating oil pressurized with nitrogen and arranged to deliver oil in liquid state, a charging line extending from said source and leading to a connector for connection to a charging fitting of the air conditioning system, said line containing a constant flow metering device adapted to pass the lubricating oil at a regulated rate, and control means including means for selectively predetermining the time period during which oil is delivered through said line and metering device to the system, and thereby to meter to the system a quantity of oil determined by said rate and the time.

* * * * *